E. BERNICK.
OPTICAL SYSTEM FOR PRISM CARRYING DEVICES.
APPLICATION FILED OCT. 23, 1908.

1,104,769.

Patented July 28, 1914.

Witnesses:
Frank E. Raffman
D. H. Deves

Inventor:
Ernst Bernick
by Dickerson, Brown, Raegener & Binney
Attys.

UNITED STATES PATENT OFFICE.

ERNST BERNICK, OF FRIEDENAU, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

OPTICAL SYSTEM FOR PRISM-CARRYING DEVICES.

1,104,769.  Specification of Letters Patent.  Patented July 28, 1914.

Application filed October 23, 1908. Serial No. 459,208.

*To all whom it may concern:*

Be it known that I, ERNST BERNICK, a citizen of the German Empire, residing at 14 Düringstrasse, Friedenau, near Berlin, Germany, have invented certain new and useful Improvements in Optical Systems for Prism-Carrying Devices, of which the following is a specification.

In various instruments, more particularly in so-called base-line telemeters and photometers, it is necessary to deflect into one direction rays coming from opposite directions.

The present invention relates to a combination of prisms which serve this purpose and comprises, in a manner which is in itself known, two prisms cemented together, with the cement surface provided in part with a reflecting coating, and forming together a prism body which exposes substantially parallel surfaces to rays coming from opposite directions.

In known prism combinations of this kind it is essential that the rays coming from opposite directions and falling upon the prism combination, to leave the latter as a single ray, are laterally displaced relatively to each other, and when the prism combination is used for example as ocular prism in a base line telemeter this gives rise to the disadvantage that the objectives must also be displaced relatively to each other unless with co-axial objectives special provision is made for compensating the lateral displacement of the axial rays produced by the ocular prism.

The present invention relates to a prism combination of the kind referred to, which directly causes co-axial rays coming from opposite directions to pass out of it united into a single ray.

Two examples of the new prism combination applied to base line telemeters are illustrated in the annexed drawing.

Figure 1:
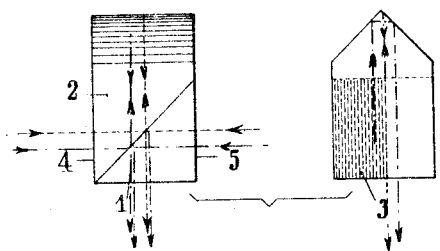
Figure 2:
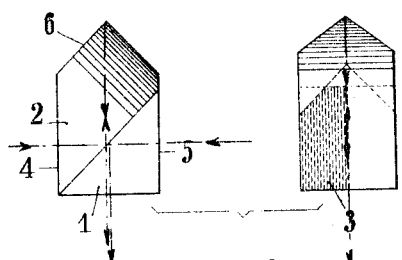
Figure 3:
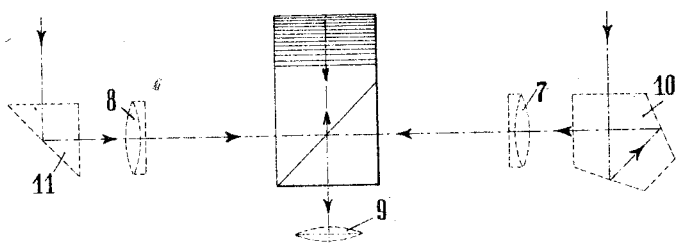
Figure 4:
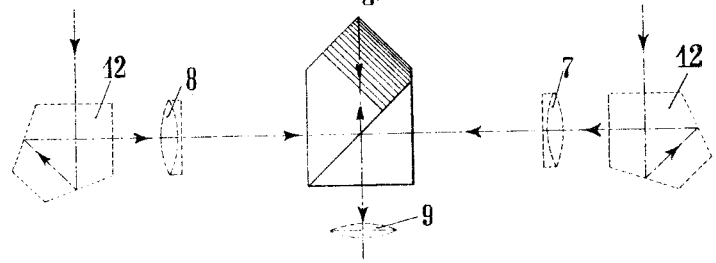

Figure 1 shows one example of the combination in plan and side view. Fig. 2 shows a modified form, also in plan and side view. Fig. 3 shows the prism combination of Fig. 1 in conjunction with the optical elements of a base line telemeter. Fig. 4 shows the combination according to Fig. 2 in conjunction with the optical elements of a base line telemeter.

In the arrangement shown in Fig. 1 the prism combination comprises a triangular right prism and a roof shaped prism 2 cemented thereto, the cement surface being in part covered by a reflecting coating 3, forming a mirror on both sides. This prism combination has two substantially parallel surfaces 4 and 5 serving as entrance surfaces for the rays to be deflected into one direction by the combination. The path of the rays is indicated in the drawing. The rays coming from one side are directly thrown out of the prism by reflection from the respective surface of the coating 3, whereas the rays coming from the opposite side are reflected by the other side of the mirror to the roof surface and are so deflected and reversed by double reflection at the roof that they are vertically displaced before they again strike the cement surface of the two prisms, and then pass through the uncoated portion of the surface and pass out of the prism in the same direction as the rays coming from the opposite direction.

The modification shown in Fig. 2 is distinguished from that shown in Fig. 1 by the different position of the roof surface of the prism 2 and by the addition of another reflecting surface 6 to the roof surface, forming with the latter a so-called triple mirror. In this construction the rays coming from one side are also directly thrown out of the prism by the reflecting coating of the cement surface, whereas the opposite side of the mirror throws the rays coming from the other side in part over the roof surface to the supplementary reflecting surface 6, and thence out of the prism, past the reflecting coating, and in part over the reflecting surface 6 to the roof-surfaces, by which they are thrown out of the prism body.

The essential difference between the constructions shown in Figs. 1 and 2 respectively becomes apparent when the combinations are used in conjunction with image-producing distance-measuring instruments etc., and will be indicated in the following description of the employment of the prism combinations in base line telemeters.

With the prism combination shown in Fig. 1, used in conjunction with an inverting basis distance measurer as shown in Fig. 3 the prism combination serves as ocular prism to project to an ocular 9 rays coming through objectives 7 and 8 from the endpoints of a base, so that images of distant objects appear at both sides of a dividing line in the field of view which is formed by the edge of the coating 3. In order to obtain with the ocular prism constructed as shown in Fig. 3, on opposite sides of the dividing line images of distant objects which are simply inverted, such as would result by rotation through 180° in space, with the dividing line as an axis, it is necessary that an even number of reflectors are placed in front of the ocular prism on one side, and an uneven number on the other, as shown in the drawing, where there is a pentagonal prism 10 on one side and a three-cornered rectangular prism 11 on the other side.

With the arrangement shown in Fig. 4 of the prism combination of Fig. 2 in conjunction with a base line telemeter, it is not necessary to have unequal numbers of reflectors on both sides of the ocular prism. In Fig. 4, accordingly, the usual arrangement of a single pentagonal prism 12 at each side of the ocular prism is illustrated.

What I claim is:

1. A prism combination for deflecting into the same direction rays coming from opposite directions, comprising two prisms cemented together, having substantially parallel surfaces facing in the directions from which the rays enter, one of which is provided with a roof surface, a coating or layer in the cement surface between the prisms extending through a part of same and being reflective on both sides and so arranged in relation to said roof surface that the rays striking the reflective coating on one side pass, after reflection by the roof-surfaces, to the non-reflecting part of the cement surface, through which they pass, whereas the rays striking the other side of the reflective coating pass after reflection directly out of the prism-body.

2. A prism combination for deflecting into the same direction rays coming from opposite directions, comprising two prisms cemented together, having substantially parallel surfaces facing in the directions from which the rays enter, one of which is provided with a roof surface, a further reflecting surface at right angles to the edge of said roof surface forming a so-called triple mirror with same, a coating or layer in the cement surface between the prisms extending through a part of same and being reflective on both sides and so arranged in relation to the faces of said triple mirror that the rays striking the reflective coating on one side pass after reflection by the faces of the triple mirror to the non-reflecting part of the cement surface, through which they pass, whereas the rays striking the other side of the reflective coating pass after reflection directly out of the prism-body, for the purpose of producing images of the objects at both sides of the prism combination, inverted relatively to each other.

3. An optical distance measuring instrument comprising two objectives and two sets of reflecting devices arranged at a distance from each other, each of the objectives adapted to coöperate with one of the two sets of reflecting devices, at least one of said sets of reflecting devices having an even number of reflecting surfaces, an image uniting body or ocular prism between said two objectives and sets of reflecting devices, and an ocular in front of said image uniting body or ocular prism, said ocular prism comprising two prisms cemented together having substantially parallel surfaces facing in the direction toward said two objectives and sets of reflecting devices, one of which is provided with a roof surface, a coating or layer in the cement surface between the prisms extending through a part of same and being reflective on both sides and so arranged in relation to said roof surface that the rays striking the reflective coating on one side pass after reflection by the roof surfaces to the non-reflecting part of the cement surface through which they pass toward the ocular, whereas the rays striking the other side of the reflective coating pass after reflection directly out of the prism-body likewise toward the ocular.

4. An optical distance measuring instrument comprising two objectives and two sets of reflecting devices arranged at a distance from each other, each of the two objectives adapted to coöperate with one of the two sets of reflecting devices, the said sets of reflecting devices differing from each other by an even number (inclusive zero) of reflecting surfaces, an image uniting body or ocular prism between said two objectives and sets of reflecting devices and an ocular in front of said image uniting body or ocular prism, said ocular prism comprising two prisms cemented together having substantially parallel surfaces facing in the directions toward said two objectives and reflectors coöperating therewith, one of which is provided with a roof surface, a further reflecting surface at right angles to the edge of said roof surface forming a so-called triple mirror with same, a coating or layer in the cement surface between the prisms extending through a part of same and being reflective on both sides and so arranged in relation to the faces of said triple mirror that the rays striking the reflective coating on one side pass after reflection by the faces of the triple mirror to the non-reflecting part of the cement surface through which they pass toward the ocular, whereas the rays striking the other side of the reflective coating pass after reflection directly out of the prism-body likewise toward the ocular.

In testimony whereof I have signed this specification in the presence of two subscribing witnesses.

ERNST BERNICK.

Witnesses:
 HENRY HASPER,
 WOLDEMAR HAUPT.